Aug. 18, 1959   J. R. WAGNER   2,900,258
PACKAGED EFFERVESCENT CONCENTRATES AND PROCESS THEREFOR
Filed Jan. 17, 1956
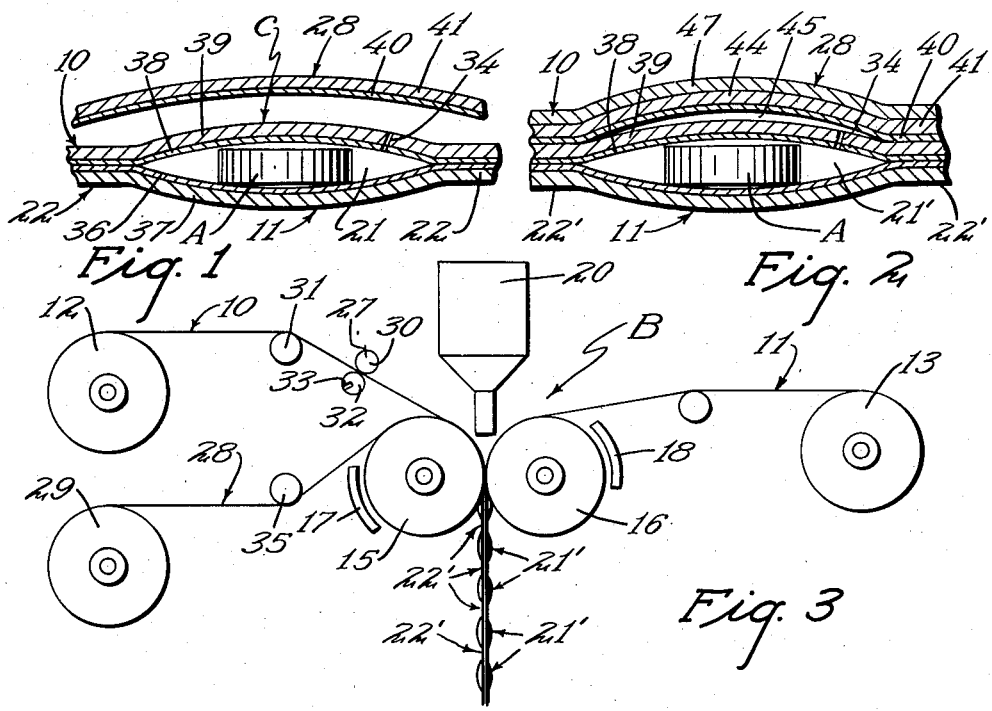
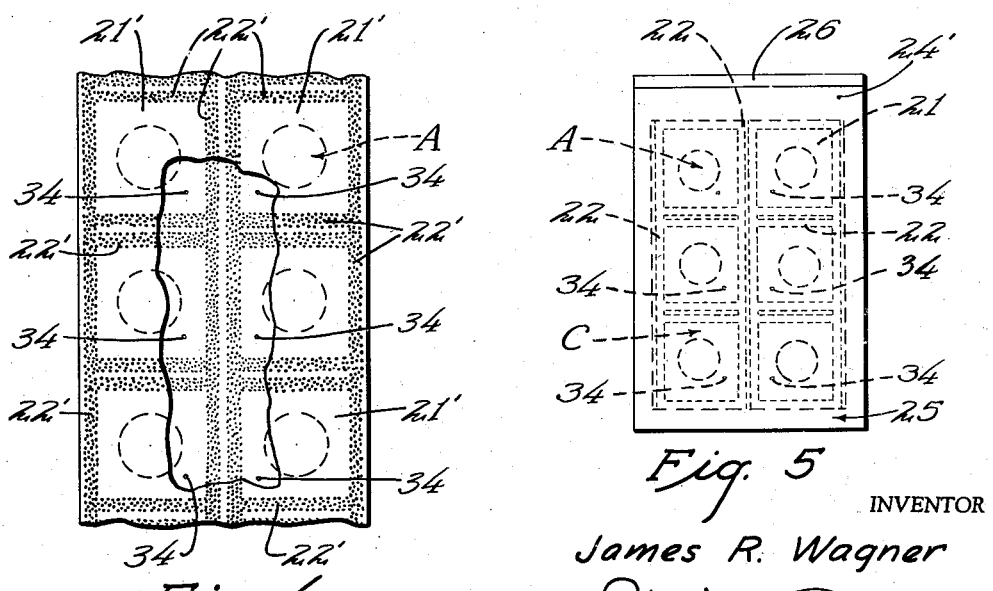
INVENTOR
James R. Wagner
BY Robert M. Dunning
ATTORNEY

2,900,258
PACKAGED EFFERVESCENT CONCENTRATES AND PROCESS THEREFOR

James R. Wagner, St. Paul, Minn.

Application January 17, 1956, Serial No. 559,659

9 Claims. (Cl. 99—171)

This invention relates to improved packaging of effervescing or carbonating concentrates. More particularly, the improvements, as described, reside in methods of packaging carbonating beverage tablets and concentrates and the products derived therefrom.

In the packaging of carbonating and effervescing concentrates, especially for making soft drinks, in flexible sealed packages as foil and air-tight wrappings a deterioration of the tablets and concentrates results which has been an unsolved problem. This resultant deterioration is a destruction of the effervescent value of the material and puffs the flexible package.

Accordingly, it is an object of this improvement to provide an economical and simple multi-layered foil structure enclosure for effervescent and carbonating concentrates as a flexible foil packaging which overcomes the problems of deterioration and puffing of the package.

Another object of this improvement is to provide an economical and simple method of manufacturing a plurality of individually packaged beverage carbonating concentrates in laminated metal foil wrappings having a gas outlet which is blocked as a moisture inlet.

An additional object of this improvement is to provide a packaged effervescent material sealed in foil coverings, one side of which is provided with a plurality of apertures and an air permeable foil covering which resists ingress of moisture and moisture vapor.

Another object of this improvement is to provide a plurality of independently packaged effervescent beverage carbonating concentrates sealed in pockets in spaced relationship in foil coverings one side of which is impermeable to air and moisture and the opposite side of which is provided with at least one aperture to each pocket and an air permeable cover over each aperture which resists the ingress of moisture and moisture vapor into the pockets.

A further object of this improvement in packaged effervescing or carbonating beverage tablets is to provide an apertured metal foil laminate portion having an air permeable and moisture vapor resistant foil covering in overlying unsealed relationship to the aperture but in sealed relationship relative to the metal foil laminate enclosing the tablets.

Further objects and advantages will be apparent from the following specification and description of the accompanying drawings, wherein:

Figure 1 is a cross-sectional view of structure illustrated, one unit of my improved packaging of a concentrate in a partially assembled state.

Figure 2 illustrates a cross-sectional view of an assembled foil packaged tablet showing a preferred modification embodied in this disclosure.

Figure 3 is a schematic illustration of a method of packaging effervescing and carbonating tablets in individually spaced apertured pockets and covering the pockets with an air permeable water impermeable foil covering material as embodied in this disclosure.

Figure 4 illustrates a packet of tablets packaged in the manner as illustrated in Figure 2 with the tablets in spaced relationship in an apertured foil wrapper and foil covering partially removed from over the apertures.

Figure 5 illustrates a foil package embodied in this disclosure.

Essentially, as indicated, the subject matter embodied in this disclosure concerns packaging effervescing and carbonating beverage tablets A in an apertured foil wrapping having a foil enclosure overlay in unsealed relationship over the aperture or apertures. In general, the structural arrangement provided in the system B is disclosed in the filed application of Robert J. Bouthilet, Serial No. 524,026, filed July 25, 1955, now abandoned, for Improved Packaging of Individual Soft Drink Concentrates, with the provision of a modification therein to provide the improvement in packaging of such concentrates as embodied herein.

As more clearly set forth in the above mentioned application and schematically illustrated herein, a pair of polyethylene coated foil films 10 and 11 are fed from bulk rolls 12 and 13, with the polyethylene coating in face to face relationship between a pair of synchronized heated rolls 15 and 16, respectively. The rolls 15 and 16 may be heated by suitable conventional means as resistance elements and steam coils therein (not shown) or otherwise by radiant heating elements adjacent the surface of the roll faces as at 17 and 18. Further, the rolls are provided with spaced pockets (not shown) to prevent crushing of the tablets A as they are fed from container 20. The edges of the pockets (not shown) in rolls 15 and 16 meet to engage the foil materials 10 and 11 and press the polyethylene facings in adhering relationship to form a series of spaced closed pockets 21 sealed entirely about their peripheral edges as at 22, in the form of a relatively endless sheet, or strip, C. As thus far described, the process and resultant packaged tablets A are manufactured in the manner as heretofore described in the above mentioned application. In the production of the foil enclosure, as heretofore described, the foils are of a pinhole free character which provides air tight enclosure pockets. Such foils are preferably of a thickness of about .0015 inch but may range slightly more or less in thickness with retention of their pin hole free character.

As shown in Figures 1 and 5, each of the pockets are punctured by a sharp tool to provide apertures 34 (shown in exaggerated size in dotted lines). A section of this strip is packaged in a foil bag 25. The foil material of the bag 25 preferably is a weight material having small pin holes of manufacture, but it may be a pinhole free covering. This pinhole free covering is provided with a small fine aperture 24' out of alignment with the prefabricated apertures 34. Bag 25 has its ends, as at 26, sealed with a waterproof adhesive. The foil thickness of the bag 25, as an outside foil covering, is preferably one of which is formed with minute pin holes as occurs in the manufacture of a foil of from about .00035 to .0005 inch thickness. There is thusly packaged one or more tablet materials A in one foil container C having one or more prefabricated apertures 24 enclosed by a bag 25, the bag 25 having minute pin holes therethrough to afford a gas release. The prefabricated aperture in the pin hole free foil wrapper in combination with the outside foil wrapping having the minute or fine pin holes, as described, provides a packaged effervescent or carbonating concentrate which does not puff the package and preserves the concentrate for prolonged and indefinite periods of time in warm and humid climates. As hereinafter described the outside foil wrapper is more suitable when provided with an air pervious and water impervious film, as indicated, with respect to Figure 1.

In the modified preferred embodiment of packaging beverage carbonating concentrates in tablet form, when sealed between polyethylene coated foil wrapping by the apparatus above described, the package is changed by providing only on one side thereof a third laminate of foil, in the manner as hereinafter described. For this structure the polyethylene coated foils 10 and 11 are fed from rolls 12 and 13 respectively, over and between the synchronized rolls 15 and 16, to encase the tablets A therebetween, in the manner as described. However, in order to provide apertures in one foil side and a laminated foil overlayer the system B has the added features of one or more synchronized rotating punches or needles 27 (one only being shown) and a supplemental film of polyethylene coated foil 28 fed from the bulk roll 29 over roll 15, to obtain the product shown in Figure 2.

The punch or needles 27 are mounted, for example, in spaced relationship, on a roller 30, between the guide roll 31 and roll 15. The roller 30 is mounted over the foil material 10 and a foil supporting roll 32, provided with relative punch receiving holes or openings 32 therein, is mounted in close synchronized rotating relationship thereunder. As the foil material 10 passes between the rollers 30 and 32, the punch or punches 27 periodically penetrate at least the foil of the foil material 10 to afford a series of spaced perforations 34 therethrough (shown in exaggerated form in Figures 2 and 4), coinciding with each of the pockets 21'.

To obtain the structure shown in Figure 2, the polyethylene coated foil 28 is fed from roll 29 under guide roll 35, passed over roll 15 beneath the foil material 10 with the polyethylene coating in contact for adherence with the foil layer of the polyethylene coated foil 10. As the polyethylene coated foils 10 and 11 and 28, pass between the pocket forming rollers 15 and 16, they are adhered together about the pockets 21 along each of the edges, as at 22' which enclose pockets 21', in the same manner as the coated polyethylene foil sheets or strips 10 and 11 as herein described. The polyethylene coated foils 10, 11 and 28, are commercial items purchased on the market in the thickness required.

As more explicitly illustrated in Figures 1 and 2, the foil layer 11 with its polyethylene coating 36, and pinhole free foil 37, forms an air and water impervious side of the prefabricated package. The foil layer 10 with its polyethylene coating 38, and foil 39, with perforation 34, forms the opposite pocket side of the prefabricated package. The layer 28 with its polyethylene coating 40 underlying foil 41, as shown in Figure 1, is representative of a loose section of an overwrap.

Considering the preferred forms, as shown in Figure 2 in conjunction with the method of individually packaging the tablets A by the structured arrangement of Figure 3, the overlay layer 28 consists of an aluminum foil 41 preferably from an economical standpoint having pin holes of manufacture therethrough and covered on one side with an air pervious water impermeable thermoplastic adhesive coating 40 which is adherent to the foil 39 under pressure, caused by passing between heated rollers 15 and 16 simultaneously with the cojoining of the thermoplastic adhesively coated foil elements 10 and 11, in the manner as described.

In joining the pockets 21' and the sealed edges 22', about the pockets 21', the foil layer 28 is an overlay relatively similarly placed under pressure and squeezed at the sealing edges 22', whereas the centered portion 44 of overlay 28 falls into the hollow spacings (not shown) provided in the rolls 15 and 16 for the formation of the pockets 21' and is not tightly pressed against the corresponding portion of foil 39. Thus there is provided a slight air space or relatively unsealed area 45 about the aperture or apertures as represented at 34 in Figures 2 and 4, corresponding to 24 in Figures 1 and 5. The gas formed in pocket 21' can now escape through the aperture 34 and gradually seep from the space 45 outwardly through the air pervious adhesive water impermeable coating 40 and the minute fine pin holes of foil 41.

In the structural package arrangements above described, the polyethylene coated foil layer 28 provides an air pervious water impermeable thermoplastic adhesive layer 40 secured to a metal foil 41 of a thickness on the order of about .00035 to .0005 inch thickness with the normal pin holes of manufacture therein. In some instances a paper covering 47 or other similar covering of the character of an air permeable "Cellophane," "Pliofilm," "Acetate," "Mylar," glassine, or a vinyl resin coating and the like, which will take printing, is adhered to the foil 41 by a thin layer of a suitable glue, gum or other conventional adhesive (not shown). In some instances the foil 41 may be of the pin hole free character provided with a fine aperture out of alignment with the aperture 34.

In the interests of economy, preservation and protection in providing foil wrapped effervescing and carbonating concentrates in normal climates, with an overlay of foil the critical relationship between the foil laminations, is to provide a sealed inside wrapper foil of a pin hole free character, the thickness of which ranges from about .001 to .0015 inch thickness, punching a small needle hole as a gas outlet in this foil wrapper and utilizing an outside foil of from about .00035 to .0005 inch thickness with critical fine pin holes therethrough and with at least one or both of the foil wrappers lined with an air permeable water impervious adherent coating. In some instances, for a dry atmosphere, the inside foil may be of .00075 inch thickness with a polyethylene liner, and which may or may not have pin holes; and the outside foil enclosure, as a bag, is a sealed foil sack wherein the foil is not free of pin holes and may range from about .00075 inch thickness or less.

In the preferred embodiment of the package structure, as shown in Figure 2 the foil 38 and foil 37 of layers 10 and 11, respectively, are of the pinhole free character ranging in thickness from about .001 to .0015 inch and punctured with a fine or small gas outlet hole 34 or 24, as described.

The hole 34 is covered by an outside foil layer 41 of .00035 to .0005 inch thickness lined on the inside with a thin air permeable water impervious coating 40 forming a closed air pocket 45 about the hole 34. In some instances of dry climate use and storage the inside layer of foil 39 may be of a thickness of .00075 inch, or slightly less, with a few fine pin holes of manufacture when lined with an air permeable water impervious coating 38, as described, and the outside foil layer 41 is of a thickness of .0005 inch thickness or less with a thin air permeable water impervious coating 40, as described. In the event a foil layer 41 of less thickness than .00035 is to be the overlay a paper or other coating 47 is adhered thereto in the preliminary manufacture of the strip 20 to strengthen and reinforce the thinner film of foil.

Air permeable water impervious coating which adheres to foil and to itself under heat, may be utilized to replace the polyethylene layers 36, 38 and 41. Such coatings although of less satisfactory values may be "Pliofilm," vinyl resins and wax materials having the properties of allowing gas to escape and stop the passage of water and moisture vapor.

In accordance with the patent statutes, I have described the principles of construction and operation of my improved packaging of effervescent and carbonating concentrates and process, and while I have endeavored to set forth the best embodiment thereof, I desire to have it understood that changes may be made within the scope of the following claims without departing from the spirit of my invention.

I claim:

1. In the method of independently packaging tablets the combination of steps comprising feeding tablets in spaced relationship between pinhole free foil sheets, puncturing one of the sheets at spaced intervals, sealing the sheets together about each of said tablets to form a pocket therebetween with each pocket being provided with at least one puncture in the covering foil therefor, covering the aperture with an air permeable closure, and sealing said closure to said sheets about the edges thereof but leaving said covering unsealed about said aperture.

2. In combination a plurality of packaged carbonating beverage tablets independently enclosed in a series of pockets between sheets of foil, one of said sheets of foil being impermeable to air and moisture and the other of said sheets having a plurality of spaced apertures therein in the wall of the pockets where the concentrate is packaged, and an air permeable and moisture resistant covering over said apertures, said covering being sealed to said sheets about the edges thereof and unsealed thereto closely about said apertures.

3. The combination comprising an effervescent concentrate packaged in a foil enclosure, said foil enclosure having an aperture therein communicating with the interior of the enclosure and an air permeable moisture impervious foil layer in marginally sealed relationship to said foil closure but in relatively unsealed relationship closely about said aperture.

4. The structure of claim 3 wherein the foil enclosure and the foil layer are provided with an adhering air permeable moisture impervious coating material.

5. In combination a packaged gas providing concentrate for the production of a beverage contained in a foil wrapper having a thickness on the order of .00075 inch to .0015 inch with at least one pinhole aperture therethrough communicating with the interior of the wrapper and a foil overlay covering the apertured foil having a thickness on the order of .00035 to .00075 inch marginally sealed to said wrapper but not sealed thereto closely about said aperture and having an aperture therein out of relative alignment with the aperture in said first foil wrapper.

6. In combination a packaged beverage carbonating concentrate contained in the pocket of a perforated foil wrapper having a perforation therethrough communicating with the pocket and lined with an air permeable water impervious coating and an air permeable water impervious lined foil overlying the perforation in said perforated foil wrapper and in sealed relationship with respect to said foil wrapper about said pocket but not sealed closely about the perforation therein.

7. The structure of claim 6 wherein the air permeable water impervious material is provided with a coating heat sealable to said wrapper.

8. The combination comprising effervescent concentrate members and an enclosure therefor, the enclosure comprising a pair of foil sheets at least one of which is air pervious and moisture impervious and includes at least one perforation communicating with the interior of the enclosure, said sheets being sealed together to provide pockets each enclosing one of said effervescent concentrate members, and an air impervious covering overlying the air pervious portion of said sheets, said covering being sealed to said sheets about said pockets but remaining free of connection with said sheets on the portions thereof overlying said pockets.

9. The structure of claim 8 and in which the air impervious covering is provided with an aperture out of alignment with any perforation in said air pervious sheet.

References Cited in the file of this patent

UNITED STATES PATENTS

| | | |
|---|---|---|
| 2,012,405 | Salfisberg | Aug. 27, 1935 |
| 2,137,243 | Heyman | Nov. 22, 1938 |
| 2,595,708 | Salfisberg | May 6, 1952 |
| 2,689,678 | Wendt | Sept. 21, 1954 |

OTHER REFERENCES

Modern Packaging, March 1954, pp. 203 to 208.